United States Patent [19]

Hashizume et al.

[11] 4,347,605

[45] Aug. 31, 1982

[54] MULTIPLEXED TELECOMMUNICATION SYSTEMS

[75] Inventors: Masao Hashizume, Tokyo; Akira Kitazawa, Chofu, both of Japan

[73] Assignee: Tokyo Shibaura Denki Kabushiki Kaisha, Kawasaki, Japan

[21] Appl. No.: 139,400

[22] Filed: Apr. 11, 1980

[30] Foreign Application Priority Data

Apr. 13, 1979 [JP] Japan .................................. 54-45174

[51] Int. Cl.³ .............................................. H04J 3/02
[52] U.S. Cl. ........................................ 370/88; 370/16; 371/68
[58] Field of Search .................. 370/24, 41, 86, 88, 370/16; 371/48, 68

[56] References Cited

U.S. PATENT DOCUMENTS 3,859,468  1/1975  Smith et al. ............................ 370/88
4,144,410  3/1979  Flickinger et al. .................... 370/88

*Primary Examiner*—Benedict V. Safourek
*Attorney, Agent, or Firm*—Oblon, Fisher, Spivak, McClelland & Maier

[57] ABSTRACT

A multiplexed telecommunication system includes two looped transmission lines connecting a plurality of stations. Each station transmits along both looped lines and receives only from the first line. If a fault condition occurs, the station receives only from the second line, by automatically changing the receiving switch.

7 Claims, 2 Drawing Figures

MULTIPLEXED TELECOMMUNICATION SYSTEMS

BACKGROUND OF THE INVENTION

1. Field of the Invention

This invention relates to multiplexed telecommunication systems, especially to time division multiplexed telecommunication systems, such as pulse code modulation (PCM) telephone networks in which a plurality of stations are interconnected in tandem by looped transmission lines.

2. Description of the Prior Art

The system of the above-noted type is used, for example, to communicate between a main station and a plurality of local railway stations.

A plurality of such stations on the loop transmission lines communicate with one another through the individual pulse multiplexing and demultiplexing circuits which are provided in each station.

That is, signals from a first station are transmitted in a respective time slot through a multiplexing circuit in the first station to a second station and are received at a demultiplexing circuit in the second station. On the other hand, signals from the second station are transmitted through a multiplexing circuit in the second station and are received at a demultiplexing circuit in the first station.

The conventional telecommunication system of this type has two individually looped transmission lines in order to maintain the reliability thereof. Thus, if a break or fault occurs in the first transmission line, termed a normal using line, each station on the looped line is immediately connected to the second transmission line which is referred to as a stand-by line, and the signals are transferred back to the normal using line, i.e. the conventional system incorporates bidirectional data transmission lines by use of the using line and the stand-by line. In order to construct the system of this type, each station must have four individual multiplexing circuits and also four individual demultiplexing circuits.

Since the multiplexing and demultiplexing circuits are expensive, especially for use in an optical communicaton system, the conventional system as outlined above becomes very expensive.

SUMMARY OF THE INVENTION

Accordingly, one object of this invention is to provide a novel time division multiplexed telecommunication system of the type described above which overcomes the above-mentioned disadvantage of such systems.

Another object of the present invention is to provide a multiplexed telecommunication system including half as many of the multiplexing and demultiplexing circuits of the conventional system, but which maintain the same reliability of the system of the type described above.

Still another object of the present invention is to provide a multiplexed optical communication system in which the looped transmission lines are constructed by the optical fiber cables and which eliminates the above-mentioned disadvantage of the conventional systems.

A feature of the multiplexed telecommunication system of this invention comprises a first looped unidirectional transmission line for transmitting signals in one direction, a second looped unidirectional transmission line for transmitting signals in a direction opposite to the above direction, a plurality of stations coupled to the first and second transmission lines, each of the stations including a first means for bi-directionally transmitting multiplexed communication signals using both the first and second transmission lines, and a second means for selectively receiving specified signals for each station from either one of the first and second transmission lines.

According to the present invention, there is provided a multiplexed telecommunication system including a plurality of stations which are connected in tandem by the two unidirectional looped transmission lines. Signals from each station are simultaneously transmitted by using both of the two transmission lines in the opposite direction with each other, and the signals for a specified station are picked up at a receiving station from either one of the transmission lines which does not have any fault therein.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
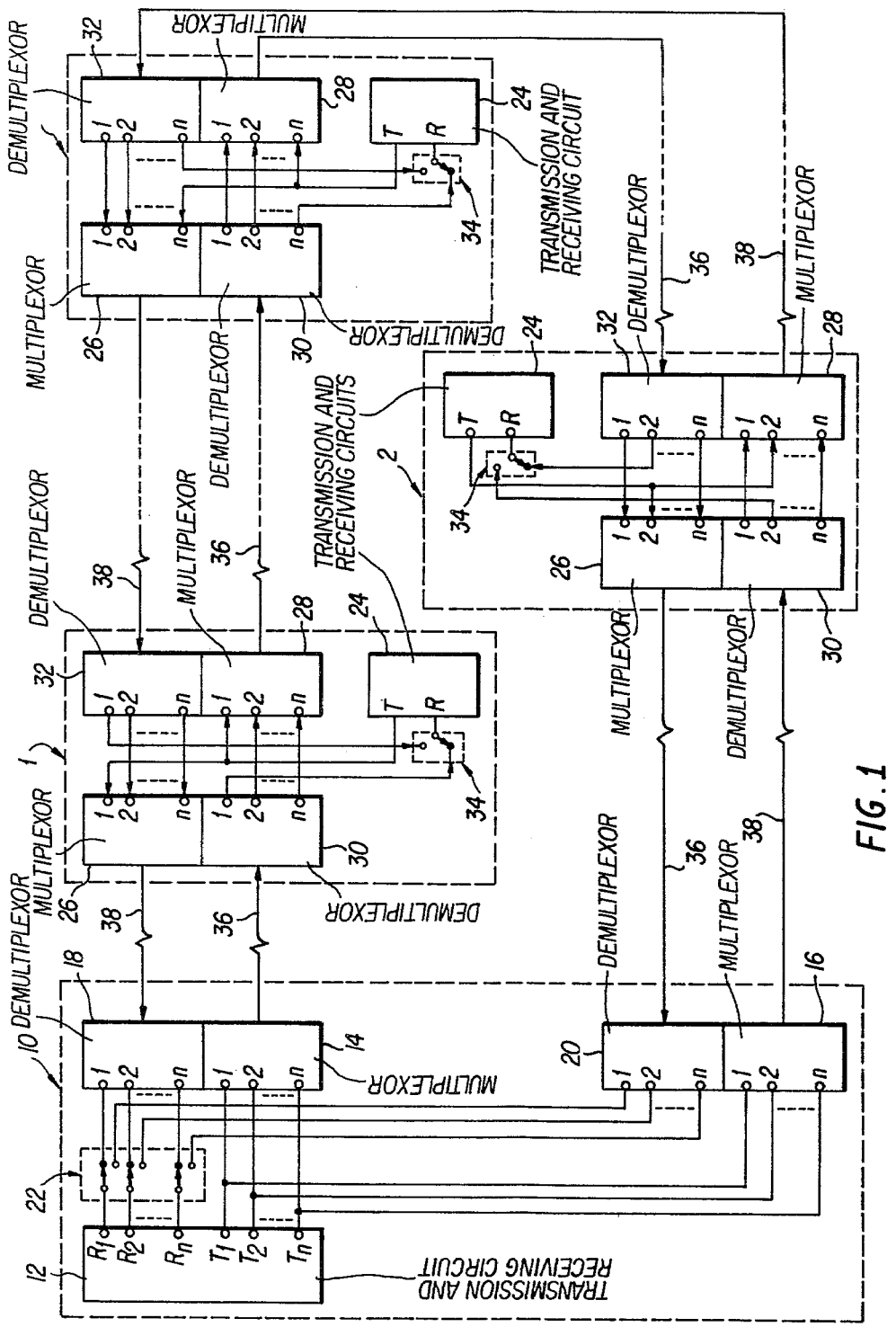
FIG. 1 is a block diagram of the basic structure of a multiplexed telecommunication system between a main station and a plurality of local stations in accordance with the principles of the present invention.

Referring now to the drawings, wherein like reference numerals designate identical or corresponding parts throughout the several views, and more particularly to FIG. 1 thereof, in the system shown therein, a main station 10 communicates with the local stations 1 . . . n. The main station 10 includes a main signal transmitting and receiving circuit 12, first and second PCM multiplexing circuits 14 and 16, first and second PCM demultiplexing circuits 18 and 20, and a changeover switch circuit 22, respectively.

Each of the local stations 1 . . . n include a local signal transmitting and receiving circuit 24, first and second PCM multiplexing circuits 26 and 28, first and second PCM demultiplexing circuits 30 and 32, and a changeover switch circuit 34, respectively.

The main station 10 and a plurality of the local stations 1 . . . n are connected in series by the two looped transmission lines 36 and 38. The tranmission lines are made, for example, of optical fiber cables or coaxial cables. The transmission line 36 transmits signals in one direction and the transmission line 38 sends signals in the direction opposite that of the line 36.

To communicate from the main station 10 to local stations 1 . . . n, signals from the transmitting terminals $T_1$-$T_n$ of the main signal transmitting and receiving circuit 12 are simultaneously applied to the respective terminal 1-n of the first and second multiplexing circuits 14 and 16 of the main station 10.

At the multiplexing circuits 14 and 16, signals are multiplexed by insertion in a time slot specified for the respective station.

The multiplexing circuits 14 and 16 unidirectionally transmit time division PCM multiplexing signals both to the first demultiplexing circuit 30 of the first local station 1 and to the first demultiplexing circuit 30 of the second local station 2 by using the respective transmission lines 36 and 38 connected to multiplexing circuits 14 and 16.

The demultiplexing circuits output specified signals for a station by seizing a time slot. The signals specified for the first local station 1 are provided from the output terminal of the first demultiplexing circuit 30 to the normally closed contact of the switch circuit 34. The signals specified for the second station 2 are also picked up in the same manner. The switch circuit 34 connects the output of the demultiplexer to the receiving terminal of the signal transmitting and receiving local circuit 24 of the station.

The signals for the another local stations are provided to the respective input terminals 1-n of the second multiplexing circuit 28 of the station. In this way, the time division PCM multiplexed signals are simultaneously transmitted by using both the first and second transmission lines 36 and 38.

Thus, the signals for the first station 1 transmitted from the main station 10 by using the second transmission line 38 are received at the second demultiplexing circuit means 32 of the first local station 1 after passing through all other local stations.

The specified signals for the first station 1 being separated by the second demultiplexing means 32 are provided to the normally open contact of the switch means 34.

Thus, in normal operation, the local stations receives the signals from the main station 10 by using the transmission line 36, hereinafter referred to as the "normal using line".

If a fault occurs in the normal using line 36 between the main station 10 and the first local station 1, the switch circuit 34 of each local station immediately connects the receiving terminal R of the signal transmitting and receiving circuit 24 to the normally open contact of the switch 34. Accordingly, the local stations can receive the signals transmitted from the main station 10 by using the transmission line 38, hereinafter referred to as the "stand-by line". Thus, the same reliability of the transmission lines as the conventional system can be maintained.

In case of transmitting signals from the local station to the main station 10, signals are provided from the transmitting terminal T of the local signal transmitting and receiving circuit 24 to the both of the first and second multiplexing means 26 and 28 of the local station. After insertion in a time slot corresponding to the station at the multiplexing means 26 and 28, the signals are bi-directionally transmitted by using transmission lines 36 and 38. In this case, the transmission line 38 is used as the normal using line and the line 36 is used as the stand-by line. Each circuit of the local stations operates in the same manner as mentioned above.

Thus, time division PCM signals from the first local station 1 are transmitted to both the first and second demultiplexing circuits 18 and 20 of the main station 10 by using both of the normal using line 38 and the stand-by line 36. The respective output terminals 1-n of the first demultiplexing circuit 18 of the main station 10 are connected to the respective normally close contacts of the switch circuit 22 and the output terminals 1-n of the second demultiplexing circuit 20 of the main station 10 are connected to the respective normally open contacts of the switch circuit 22.

The switch circuit 22 of the main station 10 connects the receiving terminal $R_1$-$R_n$ of the main signal transmitting and receiving circuit 12 selectively to the demultiplexing circuits 18 and 20. Normally, signals transmitted from the local stations are received through the normally closed contacts of the switch 22 of the main station 10.

If a fault occurs in the normal using line 38 between the main station 10 and the first local station 1, the switch circuit 22 of the main station 10 automatically changes over the connection of the receiving terminal $R_1$-$R_n$ to the normally open contacts thereof.

Usually, the transmission lines 36 and 38 are constructed by one cable line having two cores of the optical fiber. Accordingly, there happens to occur a break or fault in both transmission lines 36 and 38 at the same time. In such a case, all of the switch circuits 22 and 34 of the station 10 and 1 . . . n simultaneously change over the connection to the normal open contacts thereof in order to maintain the communication line between the main station and the local stations.

FIG. 1 shows an open looped transmission line system which terminates at the main station 10.

Figure 2:
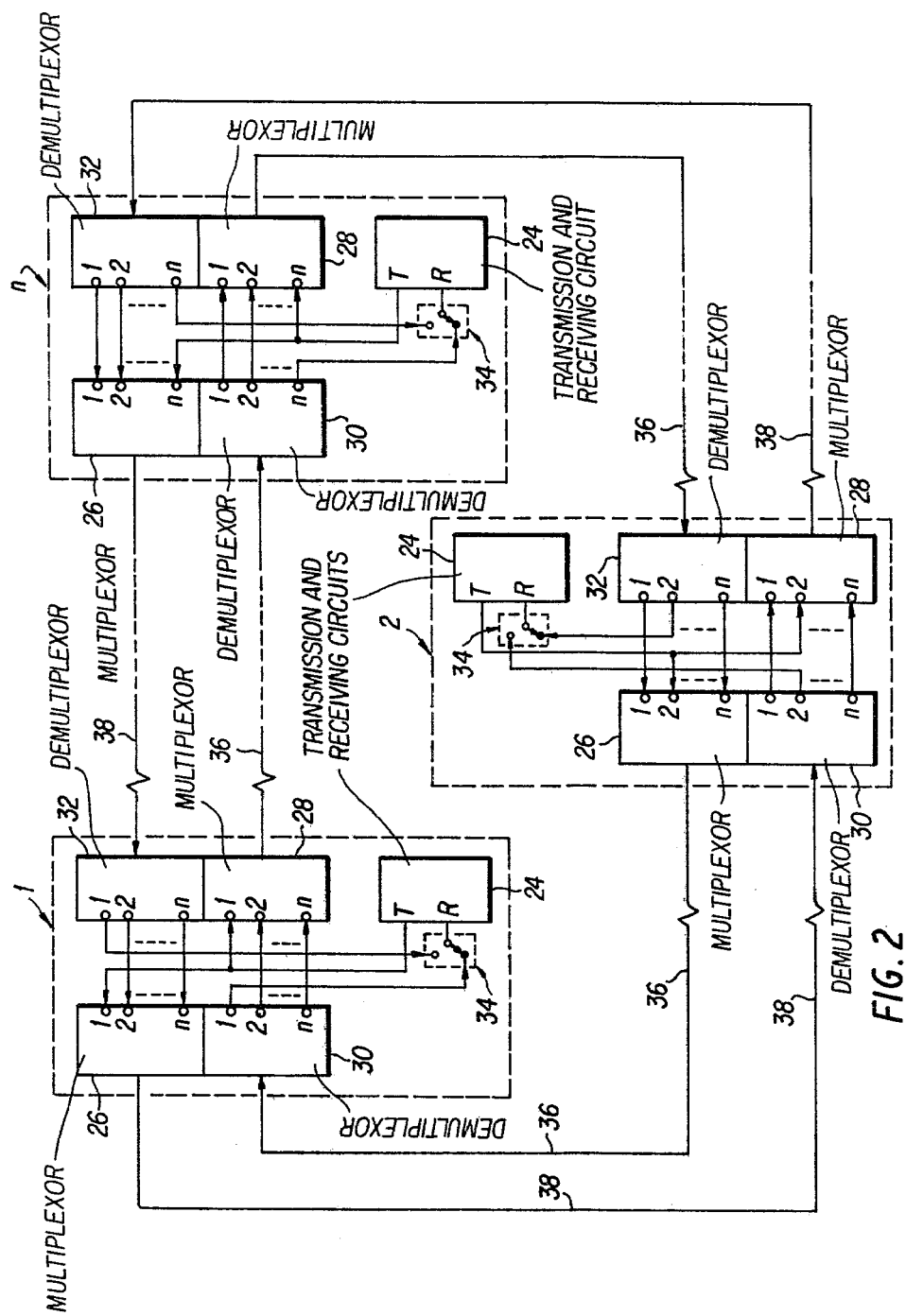
FIG. 2 is a block diagram of another embodiment of the system in which a plurality of local stations communicate with each other using two looped transmission lines in accordance with the principles of this invention.

FIG. 2 shows another embodiment of the present invention in which a plurality of local stations communicate with each other by using the two closed loop transmission lines.

Referring to FIG. 2, in case of communicating between the first local station 1 and the nth local station n, the signals dispatched from the transmitting terminal T of the signal transmitting and receiving circuit 24 of the first station 1 are simultaneously provided to the first and second multiplexing circuits 26 and 28 which are connected to the first transmission line 38 and the second transmission line 36, respectively. In these multiplexing circuits 26 and 28, signals for the nth local station are time divisionally multiplexed by insertion in a time slot which is allotted for a specified station. The time division multiplexed signals are bi-directionally transmitted by using both of the first and second transmission lines 36 and 38 to the nth local station.

At the nth local station, the signals transmitted through the first transmission line 36 are introduced to the demultiplexing circuit 32. By seizing a time slot specified for the nth station, the specified signals for the nth station are picked up at the demultiplexing circuit 32 and are provided to the normally closed contact of the switch circuit means 24 of the nth station. Accordingly, under normal operating conditions, signals are provided to the receiving terminal R of the signal transmitting and receiving circuit 24 through the first transmission loop line.

Signals from the nth station to the first station are transmitted in the same manner.

As explained above, since a plurality of stations are connected in tandem with the bi-directional transmission lines, the number of the signal multiplexing and demultiplexing means in each station can be reduced in half relative to conventional systems in order to maintain the same reliability of system as the conventional.

Obviously, numerous modifications and variations of the present invention are possible in light of the above teachings. It is therefore to be understood that within the scope of the appended Claims, the invention may be practiced otherwise than as specifically described herein.

What is claimed as new and desired to be secured by Letters Patent of the United States is:

1. A multiplexed telecommunication system comprising:
   a first looped unidirectional transmission line for transmitting signals in a first direction;
   a second looped unidirectional transmission line for transmitting signals in a second direction opposite to said first direction; and
   a plurality of stations coupled to said first and second transmission lines, each of said stations including,
   a first input connected to said first transmission line,
   a first output connected to said first transmission line,
   a second input connected to said second transmission line,
   a second output connected to said second transmission line,
   first means connected to said first output and said second output for bi-directionally transmitting the same multiplexed communication signals on both said first and second transmission lines in both normal condition and fault condition, and
   second means connected to said first input and said second input for selectively receiving signals for each station from only one of said first transmission line and said second transmission line, wherein signals from said first transmission line are received in normal condition and signals from said second transmission line are received in fault condition.

2. A system according to claim 1, further comprising:
   said stations comprising a main station and a plurality of local stations;
   wherein each of said first and second transmission lines constructs an open loop which terminates at said main station.

3. A system according to claim 1, further comprising:
   said stations comprising a plurality of local stations;
   wherein both said first and second transmission lines construct a closed loop transmission line, respectively.

4. A multiplexed telecommunication system comprising:
   a first looped unidirectional transmission line for transmitting signals in a first direction;
   a second looped unidirectional transmission line for transmitting signals in a second direction opposite to said first direction; and
   a plurality of stations coupled to said first and second transmission lines, each of said stations including,
   a first input connected to said first transmission line,
   a first output connected to said first transmission line,
   a second input connected to said second transmission line,
   a second output connected to said second transmission line,
   first means connected to said first output and said second output for transmitting the same time division multiplexed communication signals simultaneously on both said first and second transmission lines in both normal condition and fault condition, and
   second means connected to said first input and said second input for selectively receiving channel signals for each station from only one of said first transmission line and said second transmission line, wherein signals from said first transmission line are received in normal condition and signals from said second transmission line are received in fault condition.

5. A multiplexed telecommunication system comprising:
   a first looped unidirectional transmission line for transmitting signals in a first direction;
   a second looped unidirectional transmission line for transmitting signals in a second direction opposite to said first direction; and
   a plurality of stations coupled to said first and second transmission lines, each of said stations including,
   a first input connected to said first transmission line,
   a first output connected to said first transmission line,
   a second input connected to said second transmission line,
   a second output connected to said second transmission line,
   multiplexing means connected to said first output and said second output for providing on both said first and second transmission lines a plurality of time division multiplexed communication channel signals in both normal and fault conditions,
   demultiplexing means connected to said first input and said second input for detecting a specified channel signal for each station from said multiplexed signals, and
   switch means coupled to said demultiplexing means for selectively receiving said specified channel signal from only one of said first transmission line and said second transmission line, wherein signals from said first transmission line are received in normal condition and signals from said second transmission line are received in fault condition.

6. A system according to claim 5, further comprising:
   each station including receiving means coupled to said switching means;
   wherein upon detection of a fault in said first transmission line said switch means automatically switches so as to connect said receiving means to said second transmission line.

7. A multiplexed telecommunication system comprising:
   a first looped unidirectional transmission line for transmitting signals in a first direction;
   a second looped unidirectional transmission line for transmitting signals in a second direction opposite to said first direction; and
   a plurality of stations coupled to said first and second transmission lines, each of said stations including,
   first means for simultaneously bi-directionally transmitting multiplexed communication signals on both said first and second transmission lines, and
   second means for selectively receiving specified signals for each station from either one of the first or the second transmission lines which is not in a fault condition.

* * * * *